Nov. 10, 1936.  W. A. KNOOP  2,060,222
INTERPOLATING SYSTEM
Filed March 1, 1930  6 Sheets-Sheet 1
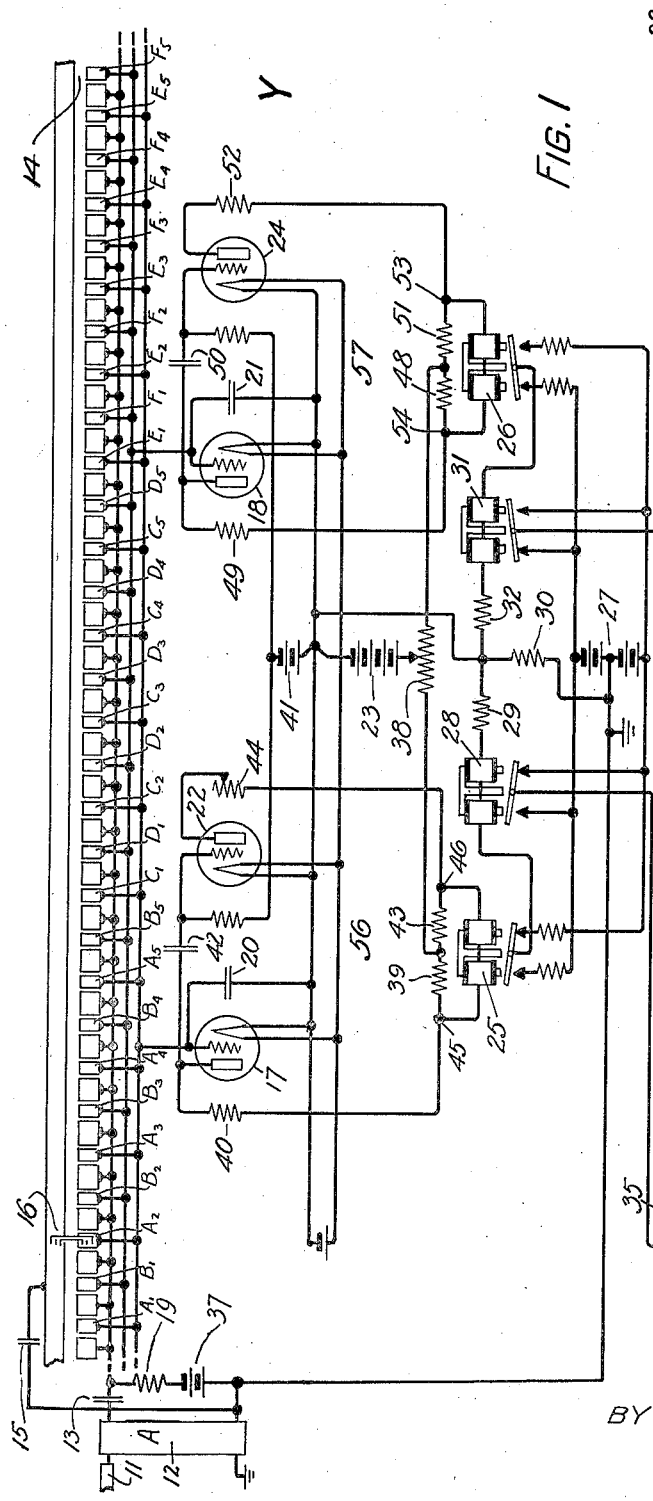
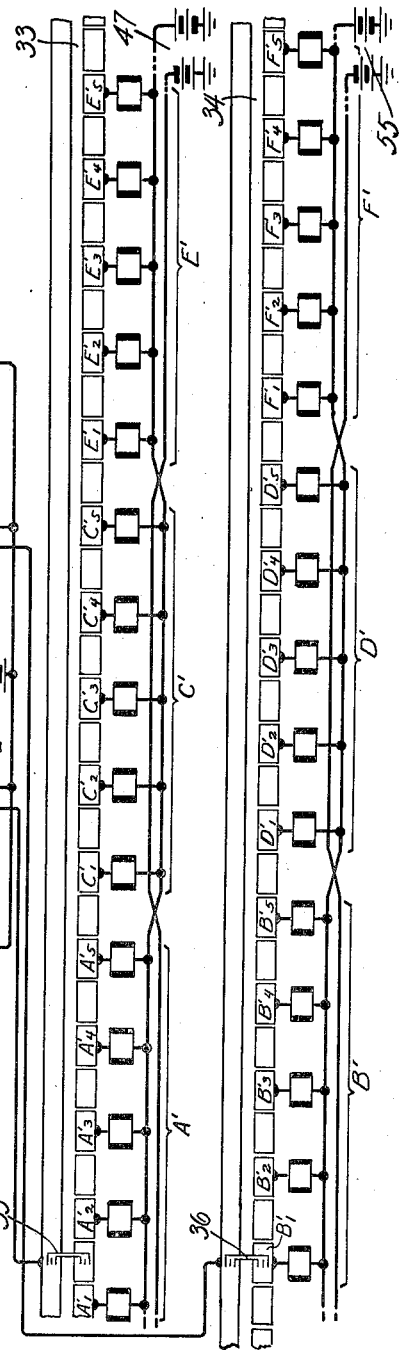
FIG.1
INVENTOR
W. A. KNOOP
BY J. W. Schmied
ATTORNEY

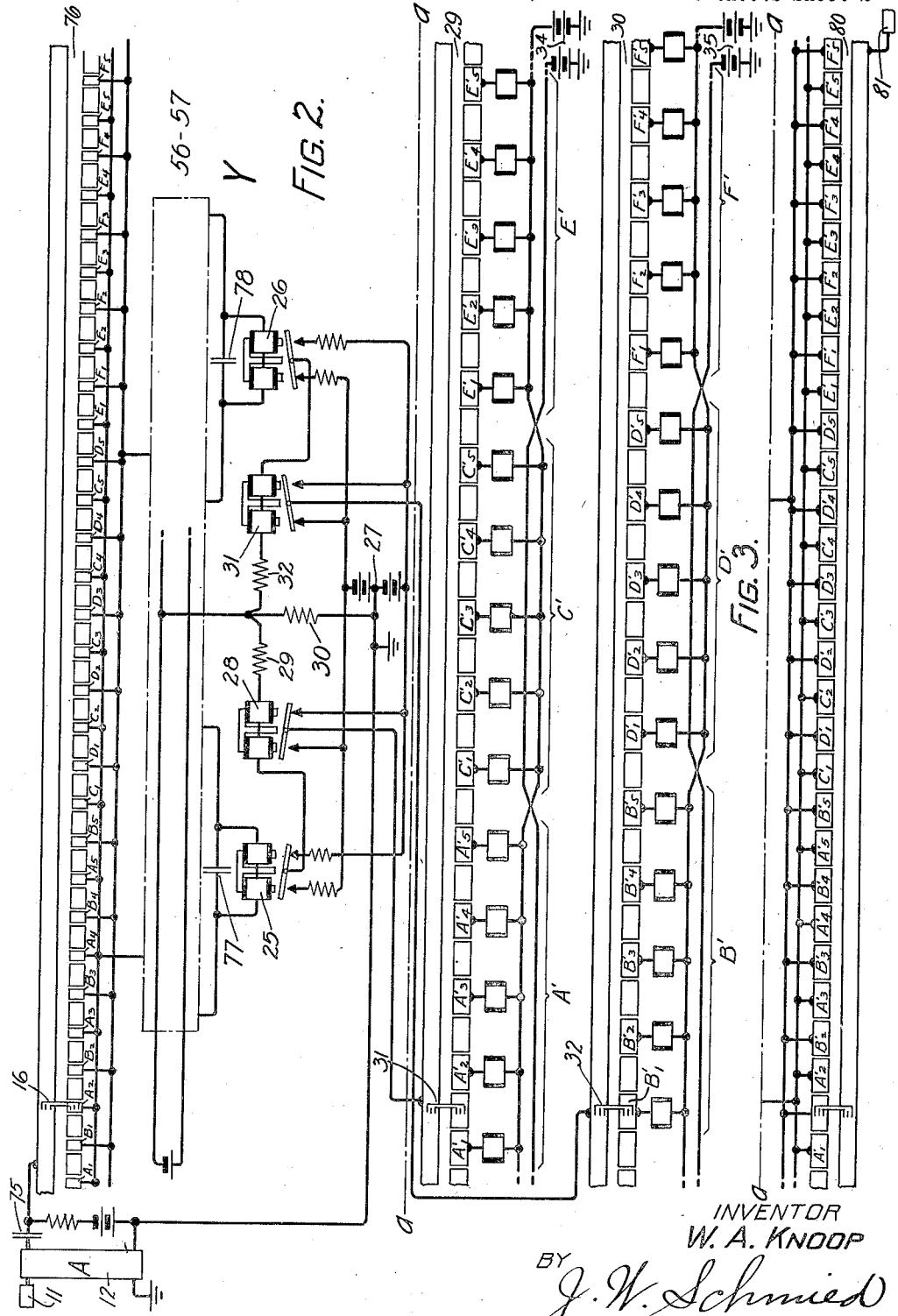
Nov. 10, 1936. W. A. KNOOP 2,060,222
INTERPOLATING SYSTEM
Filed March 1, 1930  6 Sheets-Sheet 2
INVENTOR
W. A. KNOOP
BY J. W. Schmied
ATTORNEY

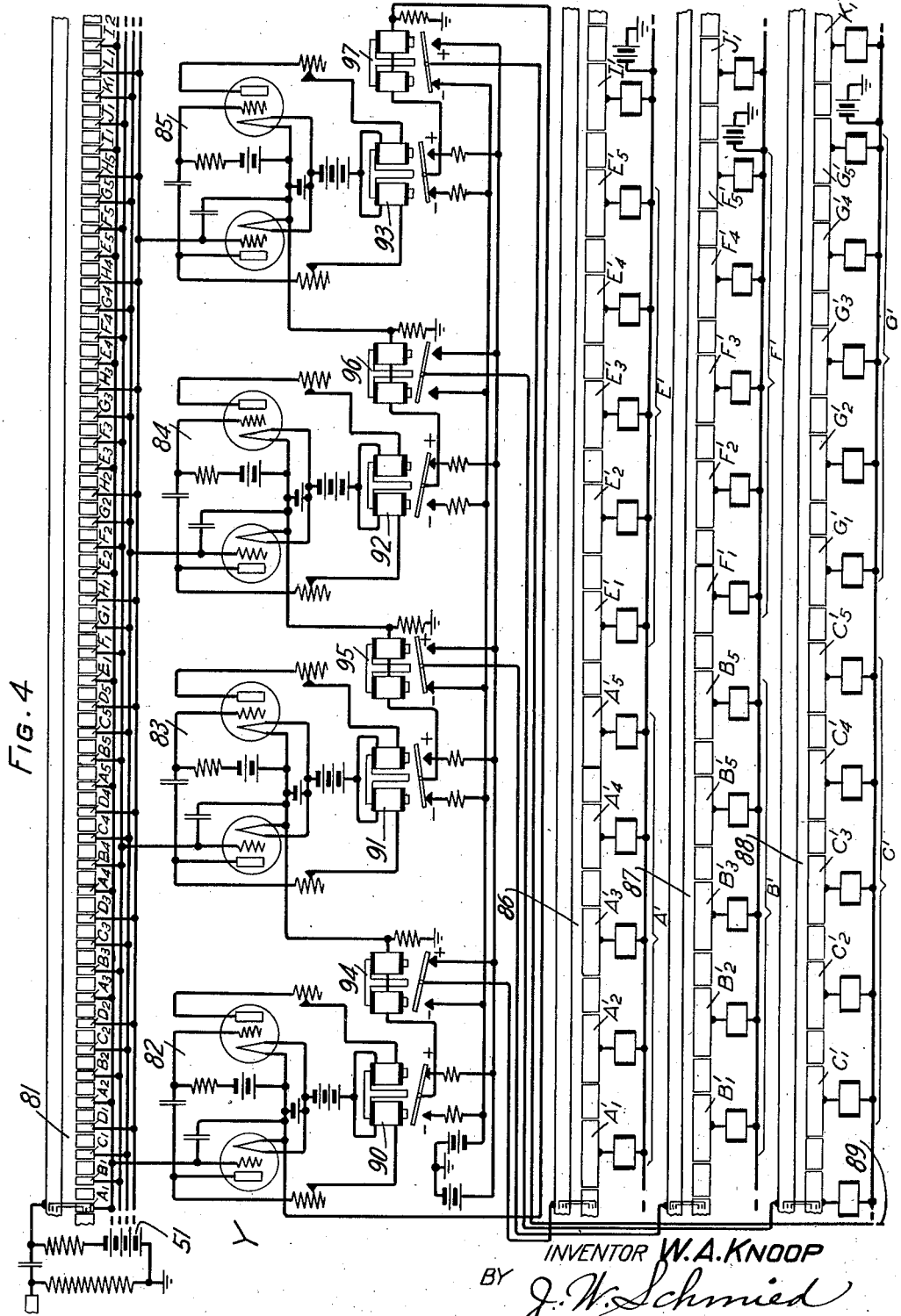

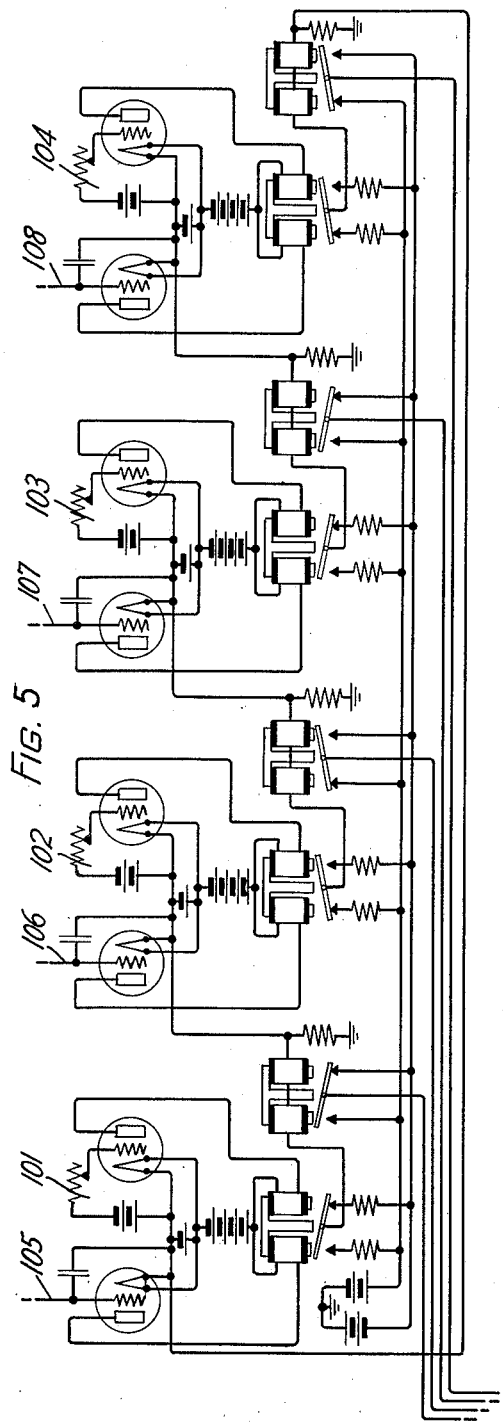
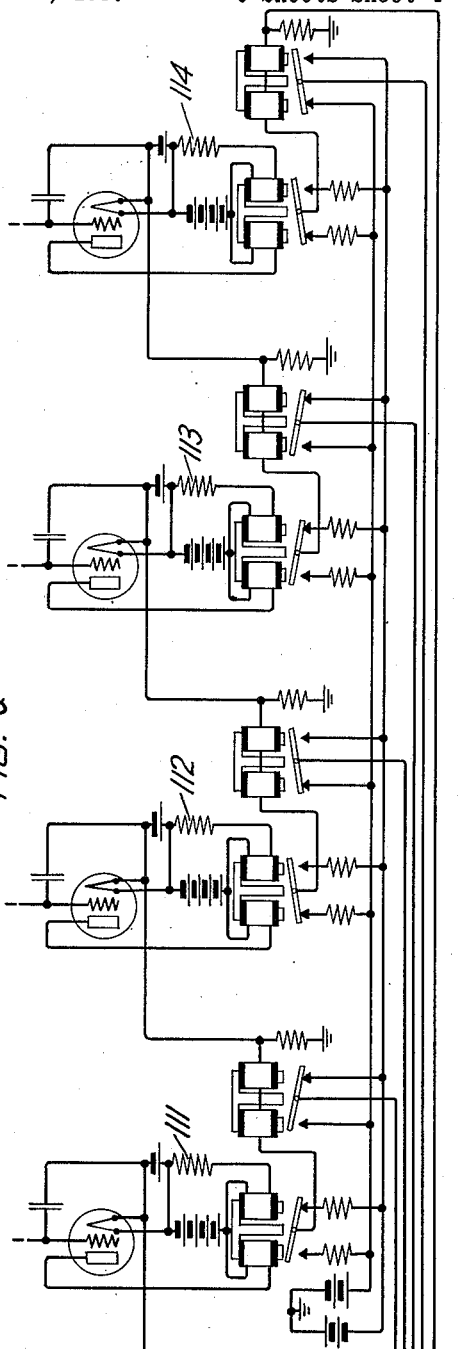

Nov. 10, 1936.  W. A. KNOOP  2,060,222
INTERPOLATING SYSTEM
Filed March 1, 1930  6 Sheets-Sheet 5

INVENTOR W. A. KNOOP
BY J. W. Schmied
ATTORNEY

Nov. 10, 1936.　　　W. A. KNOOP　　　2,060,222
INTERPOLATING SYSTEM
Filed March 1, 1930　　　6 Sheets-Sheet 6
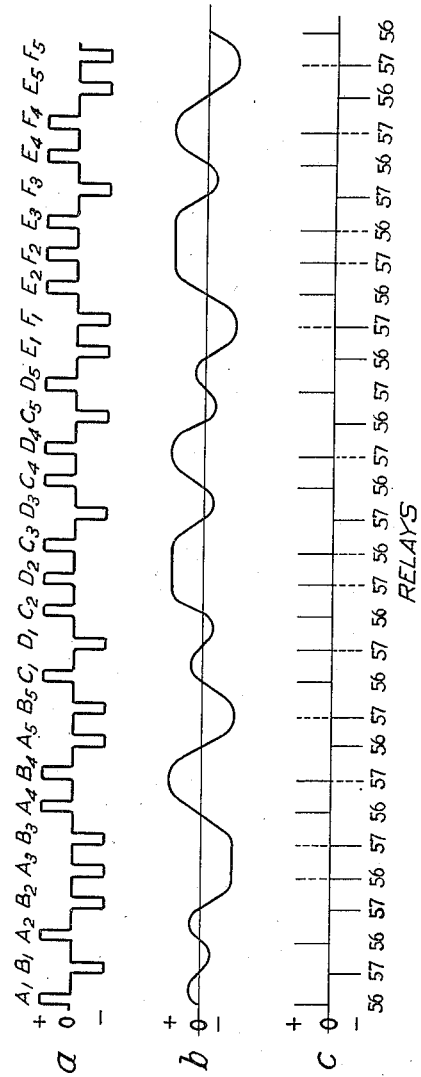
INVENTOR
W. A. KNOOP
BY
J. W. Schmied
ATTORNEY Patented Nov. 10, 1936

2,060,222

UNITED STATES PATENT OFFICE 2,060,222

INTERPOLATING SYSTEM

William A. Knoop, Hempstead, N. Y., assignor to Bell Telephone Laboratories, Incorporated, New York, N. Y., a corporation of New York Application March 1, 1930, Serial No. 432,288

10 Claims. (Cl. 178—88)

A part of the subject matter of this application is continued from U. S. Patent 1,832,308 granted to W. A. Knoop on Nov. 17, 1931.

This invention relates to synchronous telegraph systems and particularly to interpolating receiving systems for use with high speed telegraph conductors such as loaded submarine cables.

Objects of the invention are to simplify and to increase the effectiveness of interpolating receiving systems.

Another object is to repeat signal impulses from a plurality of low speed lines into a single high speed line, and, after transmission thereover, to interpolate the single impulses which have been lost during transmission and retransmit all impulses into a plurality of lines corresponding to those at the originating end.

In high speed signaling transmission systems short signal impulses are attenuated because of the characteristics of the transmission line and must be rebuilt at the receiving end or the relay point. Heretofore receiving systems adapted to accomplish this purpose have been commonly termed "vibrating relay systems". This expression is somewhat misdescriptive of the system of this invention because short impulses are rebuilt without necessarily vibrating any relays and, therefore, in this specification the expression "interpolating receiving system" will be used to define a system which restores or interpolates short signal impulses which have been attenuated to such an extent that they are incapable of controlling a receiving relay or a relay for retransmitting the impulses into the next line section.

It has been the practice, heretofore, to interpolate at the receiving end of a telegraph circuit missing signal impulses of unit length which have been practically completely attenuated during transmission because of their high frequency.

British Patent No. 321,990, the complete specification of which was accepted Nov. 25, 1929, discloses an interpolating system in which a pair of receiving relays have line windings arranged to be energized by the incoming signals, and local or interpolating windings arranged to be energized under the control of the contacts of both relays. When no or weak signal impulses are being received the local or interpolating windings are energized to hold the relay armatures against contacts of opposite polarity whereby unit impulses of alternate positive and negative polarity are generated as the brushes on a rotary distributor make contact with segments alternately connected to each relay. When signal impulses of greater than unit length are received the current in the line windings increases, thereby moving the relay armature against contacts of like polarity to generate a series of impulses of the polarity corresponding to the received impulses of greater than unit length.

In the applicant's U. S. Patent No. 1,832,308 supra of which a part of the subject matter of this application has been continued, there is disclosed a system different from those previously known, in that the separate interpolating and line windings have been eliminated, the line voltage and the interpolated voltage being superimposed on the same windings of each receiving relay. The system disclosed in that patent is particularly arranged to operate with an odd number of receiving relays, these relays being responsive to the signals themselves.

In another of the applicant's U. S. patents, No. 1,799,627, which was issued April 7, 1931, there is disclosed a system similar to those disclosed in the above mentioned applications, which comprises arrangements wherein the time derivatives of the received signal impulses instead of the signal impulses themselves, are impressed on the relay windings. In the derivative system, line voltages only are impressed on the relay windings and the interpolated impulses are produced over the relay contacts, independently of the relay windings, as the brushes on the printer distributors rotate over their respective segments when the line voltage is of insufficient strength to operate the relays.

The system of the present invention differs from those previously known, notably that disclosed in U. S. Patent 1,832,308, supra, in that an even number of relays are employed and special storing or delay arrangements are provided. This system together with that disclosed in U. S. Patent 1,832,308, are of the regenerative type, whereas the system disclosed in U. S. Patent, 1,799,627, supra, is of the derivative type.

In the drawings, Fig. 1 shows a schematic of a receiving circuit in which the delay feature is provided by a primary storing condenser in a system employing two receiving relays, two being shown as typifying any desired even number. The relays are shown used in conjunction with vacuum tube storing and impulse lengthening arrangements.

Fig. 2 is a modification of Fig. 1 wherein storing condensers arranged in shunt to the relays are employed to furnish the delay feature.

Fig. 3 shows another modification of Fig. 1 wherein a single repeating distributor is employed in place of two printer distributors. The signals generated by the relays are repeated over the single distributor to a second cable for further transmission.

Fig. 4 shows a modification of Fig. 1 wherein the storing feature is omitted and an even number of receiving relays greater than two may be employed.

Figure 7:
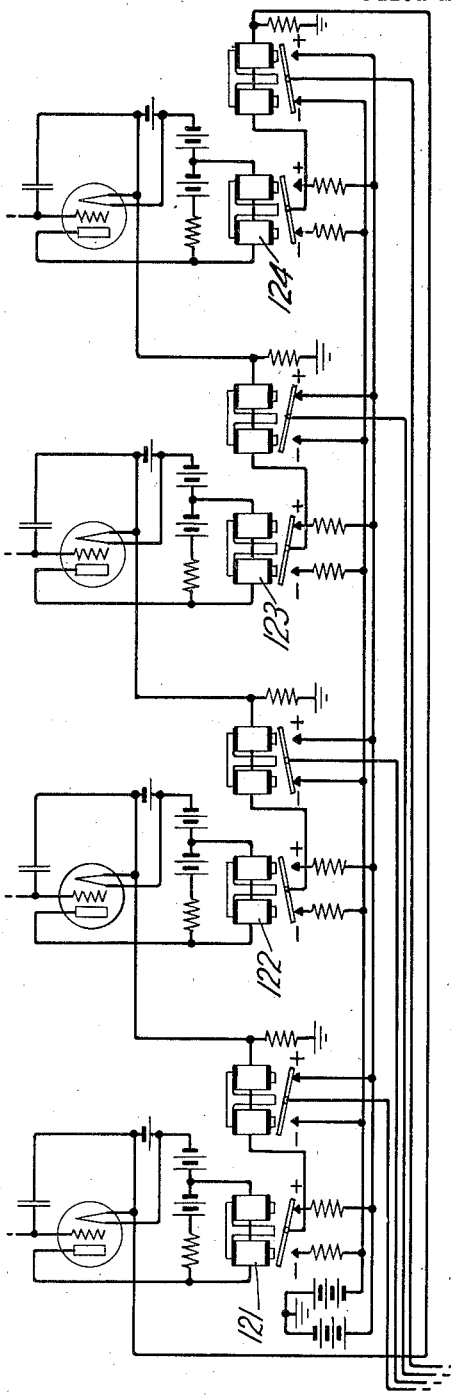

Figs. 5, 6, 7, and 8 show modifications of Fig. 4 wherein different arrangements of vacuum tube storing and impulse lengthening circuits are employed.

Fig. 9 shows curves representing the operation of the circuit arrangements of Figs. 1 to 8.

*Description of the circuit of Fig. 1*

Fig. 1 represents the receiving end of a submarine cable telegraph system wherein signals transmitted by successive groups of transmitters in rotation at a distant station (not shown), are received and directed to respective groups of printers at the receiving station. The groups of transmitters at the distant station each consist of two transmitters to correspond to the two receiving relays at the receiving station. The transmitters of each group are arranged to alternately transmit signal impulses over cable 11 so that the impulses from the two transmitters in a group are interleaved with respect to each other, on the cable. The transmitters are connected in rotation through a sending distributor to the cable at the distant station in a manner similar to that shown in Fig. 1 of the applicant's U. S. Patent No. 1,832,308, supra, except that two instead of three transmitters are provided for each group.

Assume that three groups of two transmitters each are provided and that transmitters are designated by letters A to F respectively, then an impulse from transmitter A is followed on the cable by an impulse from transmitter B, this operation being repeated with the other impulses from each of transmitters A and B until all five impulses from transmitters A and B are sent. Transmitters C and D in the second group and E and F in the third group are similarly connected and operated over the sending distributor.

The interleaved impulses from transmitters A to F are received at the receiving station, repeated through amplifier 12 and condenser 13 and over the segments of receiving distributor 14 to the primary storing condenser 15 wherein the signals are stored and then repeated over the distributor segments to the corresponding printers A' to F'.

The receiving distributor 14 comprises a continuous and a segmented ring arranged to be interconnected by a continuously rotating brush 16. The segmented ring is divided into alternate long and short segments. The long segments are connected in multiple through condenser 13 and amplifier 12 to the cable 11 and the short segments are connected in multiple to form two groups, the segments of one group being interleaved with those of the other group. The segments of one group are connected to the input circuit of vacuum tube 17 and the segments of the other group are connected to the input circuit of vacuum tube 18. Connected to the continuous ring is condenser 15 which is arranged to receive and store the incoming signal impulses as the brush 16 rotates over the long segments and to transmit the stored charges to either of the vacuum tubes 17 or 18 as the brush subsequently rotates over the short segments.

The impulses from transmitters A and B are received through amplifier 12 and blocking condenser 13 over the long segments of distributor 14 and stored in condenser 15. Condenser 13 is of large capacity and operates in conjunction with a relatively high resistance 19 to store an effective charge on condenser 15 when brush 16 rotates over a long segment at the time an effective impulse is received from the amplifier. When brush 16 subsequently engages with a short segment, a charge on condenser 15 is discharged and impressed on either of the input circuits of vacuum tube 17 or 18. Connected to the input circuits of vacuum tube 17 and 18 and in shunt to the grids thereof, are condensers 20 and 21 respectively, which serve to lengthen the duration of time during which the charges are applied to the vacuum tube grids in order that the resultant current in the output circuit may be effective to operate a slow operating relay.

Vacuum tube 22 is connected in cascade to vacuum tube 17, the plate circuits of both these tubes being connected to a common battery 23, and vacuum tube 24 is similarly connected to vacuum tube 18, the plate circuits of both these tubes being also connected to battery 23. Therefore, each pair of vacuum tubes is connected to one of the multiple groups of short segments of distributor 14 and inasmuch as the short segments of each group are subsequently engaged by brush 16, condenser 15 will be subsequently connected to the two pairs of vacuum tubes. Connected in shunt to the plate circuits of vacuum tubes 17 and 22 is receiving relay 25 and connected in shunt to the plate circuits of vacuum tubes 18 and 24 is receiving relay 26, and any difference in potential between the points of the circuit to which each relay is connected will operate the relay. The normal plate currents of each pair of tubes are balanced and therefore, the relays being of the unbiased polarized type will normally maintain the respective armatures in engagement with one of their associated contacts. Contacts of each relay are connected to opposite poles on battery 27. The armature of relay 25 is connected in a circuit extending through the windings of printer relay 28, regulating resistance 29, regenerating resistance 30, to ground, and the armature of relay 26 is connected in a circuit extending through the windings of printer relay 31, regulating resistance 32, and regenerating resistance 30 to ground. Relays 28 and 31 are also of the unbiased polarized type and normally assume positions corresponding to those of relays 25 and 26, respectively. Contacts of relays 28 and 31 are also respectively connected to the opposite poles of battery 27. The armatures of relays 28 and 31 are respectively connected to printer distributors 33 and 34, each of which comprises a continuous and segmented ring, the continuous rings being the points of connections for the armatures. The segmented rings each consist of ten alternate live and dead segments for each of the transmitters A to F at the distant station, so that for the six transmitters, with the receiving signals split two ways as shown by the two groups of short segments on receiving distributor 14, each segmented printer ring has thirty alternate live and dead segments. The printer distributor rings are concentrically arranged with receiving distributor rings 14, one brush arm being provided with brush 16 for distributor 14, brush 35 for distributor 33, and brush 36 for distributor 34, disposed thereon in the same radial alignment. The live segments $A'_1$, $A'_2$, $A'_3$, $A'_4$, and $A'_5$, are respectively connected to the magnets of printer A', the live segments B'₁, B'₂, B'₃, B'₄, and B'₅, are connected to the magnets of printer B' and so on for the remaining live segments, each group of five being connected to the magnets of a printer as shown. In order to have the proper sequence of operation for the printers, the segments of each of the two printer ring sets or distributors 33 and 34 are so positioned with respect to the short segments of receiving ring set 14 that when receiving brush 16 on ring set 14 is passing through the center of a short segment the brush of the printer ring set, containing the corresponding live segment, is in the center of the dead segment immediately at the left-hand side of such corresponding live segment; in other words, should brush 16 be passing the center of segment A₃ of ring set 14, brush 35 will be in the center of the dead segment immediately to the left of segment A'₃. Therefore, in accordance with the arrangement of the short segments of ring set 14 and the corresponding live segments in rings 33 and 34 printers A', B', C', D', etc. will be operated in sequence.

To interpolate impulses at the station shown, in order to replace those of unit length which are lost or greatly attenuated during transmission over cable 11, currents of the alternate positive and negative polarities are generated from a local source of potential 27 as brushes 16, 35 and 36 rotate over their respective distributor ring sets, provided, of course, that no signal impulses of two or more units length are received in the interim from the cable. These unit impulses of alternate positive and negative polarities are produced by the receiving relays 25 and 26, which normally maintain their respective armatures in opposite positions, as will hereinafter be described.

In the event that a long impulse, that is one of two or more units length is received from the cable, the intensity of the impulse does not reach an effective value until the second unit of the impulse is received.

Assume, then, that this long impulse is of positive polarity and that the second unit of the impulse is received over the long segment preceding the short segment designated A₁ of the receiving ring set 14, by brush 16, this signal is immediately stored on condenser 15. When brush 16 subsequently reaches the short segment A₁, the stored charge of condenser 15 is applied to condenser 20 and to the grid of vacuum tube 17 in parallel. The grid of vacuum tube 17 is negatively biased by battery 37 and the discharge of condenser 15 causes a positive charge to be stored on condenser 20, and this charge prolongs the positive potential simultaneously impressed on the grid of tube 17 by the signal itself. Consequently, the space current through tube 17 is increased, causing a corresponding increase in current in the plate circuit, which extends from the positive pole of battery 23, through variable resistance 38, resistances 39 and 40, plate and filament of tube 17 to the negative pole of battery 23. The second vacuum tube 22 of the first pair has its grid normally biased negatively with respect to its filament by battery 41 and as the plate current of tube 17 flows through resistance 40, a voltage drop is produced across the resistance in such a direction that a positive potential is impressed on condenser 42 to make the grid of tube 22 more negative, thereby causing a decrease in the space current of tube 22 and a corresponding decrease in current in the plate circuit which extends from the positive pole of battery 23, variable resistance 38, resistances 43 and 44, plate and filament of tube 22 to the negative pole of battery 23. The predominance of current in the plate circuit of tube 17 causes a difference of potential between the points 45 and 46 which sets up an operating current through the windings of receiving relay 25 to move the relay armature against its right-hand or positive contact, as shown. The engagement of the armature and right-hand contact of relay 25 allows a positive current to flow from battery 27, right-hand contact and armature of relay 25, through the windings of printer relay 28, regulating resistance 29, and regenerating resistance 30, to ground. Relay 28 moves its armature at its right-hand or positive contact and as brush 35 reaches segment A'₁ on printer ring set 33, a positive potential exists in the circuit extending from battery 27 over the armature and right-hand contact of relay 28, brush 35, segment A'₁, through the winding of the first magnet of printer A₁, to the positive pole of battery 47, but the magnet does not operate because positive battery is connected to both ends of the operating circuit.

The positive current flowing through the windings of relay 28 produces a voltage drop across regenerating resistance 30 in such a direction as to make the filament of tube 18 of the second pair of vacuum tubes more positive with respect to its associated grid, and should no signal impulse be received when brush 16 reaches short segment B₁, the effect of the voltage drop across resistance 30 would cause a decrease of current in the plate circuit of tube 18, which extends from the positive pole of battery 23, variable resistance 38, resistances 48 and 49, and plate and filament of tube 18 to the negative pole of battery 23. This decrease in plate current effects a voltage drop across resistance 49 in such a direction as to impress a negative charge on condenser 50 and this in turn makes the grid of tube 24 of the second pair positive with respect to its associated filament, the grid of tube 24 being normally biased negatively from battery 41. Consequently, the space current in tube 24 is increased and causes a corresponding increase in current in the plate circuit extending from positive pole of battery 23, variable resistance 38, resistances 51 and 52, plate and filament of tube 24, to the negative pole of battery 23. The predominant current in the plate circuit of tube 24 causes a difference in potentials between points 53 and 54, thereby causing an operating current to flow through receiving relay 26 in such a direction as to move the relay armature into engagement with its left-hand or negative contact, as shown. The operation of the armature of relay 26 to its left-hand contact causes a negative current to flow from battery 27 over the left-hand contact and armature of relay 26, through the windings of printer relay 31, regulating resistance 32, through the winding of relay 28, armature and right-hand contact of relay 25 to the positive pole of battery 27. This current operates the armature of relay 31 to its left-hand contact, and holds the armature of relay 28 at its right-hand contact. When brush 36 reaches segment B'₁ on ring set 34, a negative potential exists in the circuit extending from battery 27 over the left-hand contact and armature of relay 31, brush 36, through the first magnet of printer B' to positive battery 55, to cause the first magnet of battery B' to operate.

Assuming that the long impulse received from the cable is more than two units in length than the voltage drop which will be produced across resistance 30 by the operating current of printer relay 28 is overcome by the signal voltage because the charge on condenser 15 resulting from the third unit of the transmitted long impulse, is being simultaneously received over segment B₁, and the resulting action of tubes 18 and 24 is the same as that described above for tubes 17 and 22. Therefore, the action of tubes 18 and 24 in response to the third unit of the long positive signal causes receiving relay 26 and printer relay 31 to hold their respective armatures to their right-hand or positive contacts. Therefore, when brush 36 reaches segment B'₁ of ring set 34, a positive potential exists in the circuit extending from battery 27 through the windings of the first magnet of printer B' to the positive pole of battery 55 and the magnet does not operate.

The positive current which operated printer relay 31 in response to the third unit of the signal, causes a voltage drop across regenerating resistance 30 in such a direction as to make the filament of tube 17 more positive with respect to its associated grid, thereby decreasing the normal plate current of tube 22, so as to effect a difference in potential between points 45 and 46 to operate relay 25 to its opposite or negative position. Likewise, printer relay 28 operates to its opposite position, but should the fourth unit on the incoming signal be also positive, a positive potential will be impressed on the input circuit of vacuum tube 17 at the same time that the potential from the voltage drop in resistance 30 is impressed on the filament of tube 17 and the incoming signal voltage would predominate to make the grid positive with respect to the filament so that instead of a decrease and an increase respectively in the plate circuits of tubes 17 and 22, there will be an increase in the plate circuit of tube 17 and a decrease in the plate circuit of tube 22 whereby receiving relay 25 and printer relay 28 will hold their respective armatures against their right-hand or positive contacts. When incoming signals of two or more units are impressed on the receiving circuits 56 and 57, the receiving and the printer relays will be maintained in like positions and during the time that no effective signals are being received, that is, those constituted of unit length impulses of alternately opposite polarities, the relays of each receiving circuit will assume opposite positions which they will maintain for the duration of a no-signal interval.

In order to maintain receiving circuits 56 and 57 normally balanced, variable resistance 38 is employed for regulating the amount of potential furnished by battery 23.

The operation of the receiving and the printer relays is continued until printers A' and B' have been respectively set in the positions corresponding to the two characters transmitted by transmitters A and B at the distant station. The same relays then respectively operate printers C' and D' and then E' and F' to print the characters transmitted by transmitters C and D and E and F.

*The operation of circuit arrangement of Fig. 1*

Referring to Fig. 9, a clear understanding of the method of interpolating impulses of unit length in a message whereof the transmitted unit impulses have been lost in transmission, may be had. Curve $a$ represents the signal wave as it is transmitted from the distant station, curve $b$ the same wave as it is received by amplifier 12 with the impulses of unit length greatly attenuated, and curve $c$ indicates the operation of the receiving circuits 56 and 57. In curve $c$ the full vertical lines indicate the polarities of the signals regenerated in the receiving circuits at the receiving station, in response to impulses received from the line or the interpolated impulses, to operate the relays, and the dotted vertical lines indicate the polarity of the interpolated impulses which tend to operate the relays at the time the relays are under the control of incoming line signals. In curve $a$, the first impulse is of unit length and of positive polarity, but at the time it passes from the distant station to the receiving station, it is greatly attenuated as shown in curve $b$.

The incoming impulse is stored in condenser 15 when brush 16 passes over the long segment preceding the short segment A₁, and is discharged from the condenser when brush 16 passes over segment A₁, and impressed on the receiving circuit 56, but, it being of low amplitude, the resulting difference of potential produced across points 45 and 46 in the receiving circuit is insufficient to operate relay 25. It is assumed that the armature of relay 25 is in engagement with its right-hand or positive contact, indicated by the first verical line in curve $c$, and when brush 35 reaches segment A'₁, the first magnet of printer A₁ does not operate because of positive battery being connected to both ends of the operating circuit. As brush 16 passed over the long segment following segments A₁, and assuming that the armature of relay 26 is also in engagement with its right-hand contact, the voltage drop produced in resistance 30 by the positive current flowing through printer relay 28, upsets the balance of receiving circuit 57 in such direction as to operate relay 26 to the left-hand or negative position, as shown.

Inasmuch as the incoming signal impulse received by brush 16 from the long segment following segment A₁ and then impressed on receiving circuit 57 when brush 16 subsequently passes over segment B₁, is of unit length and consequently of low amplitude, there is no voltage drop across resistance 30 and no current flows in circuit 57, thereby maintaining relay 26 at its negative position, as shown by the second full vertical line in curve $c$. When brush 36 reaches segment B'₁ or ring set 34, negative battery 27 is connected to positive battery 55 through the windings of the first magnet of printer B' and the magnet operates.

When brush 16 passes over the large segment and its adjacent segment A₂ in sequence, there is no voltage drop across resistance 30 and consequently no current flows in receiving circuit 56. Relay 25 therefore remains in its positive position as shown by the third full vertical line of curve $c$ because as the third impulse designated in curve $b$ as positive, is also of unit length. As the brushes continue to rotate, brush 35 reaches segment A'₂ and connects positive battery 27 through the second magnet of printer A' to positive battery 47, thereby not operating the magnet.

When brush 16 passed over the long segment and its adjacent segment B₂ in sequence, again no voltage drop is produced across resistance 30 and no resultant current is produced in receiving circuit 57 to energize the windings of receiving relay 26. Relay 26 therefore remains in its negative position as indicated by the fourth vertical line in curve c. As brush 36 reaches segment B'₂, the negative pole of battery 27 is connected through the winding of the second magnet of printer B' to the positive pole of battery 55 thereby operating the magnet.

This operation is repeated as long as no signal impulses of two or more units length are received and the interpolating impulses are, therefore, of alternate positive and negative polarities.

However, it will be noted that the fourth impulse in curve b is the beginning of a long impulse of three units length and consequently, the line current of the long impulse rises to an amplitude sufficient to effectively upset the balanced condition in circuits 56 and 57. Accordingly, as brush 16 passed over the long segment and its adjacent segment A₃, the second unit of the long negative signal was received from the line and impressed on the receiving circuit 56 and the strength of this impulse is sufficient to operate circuit 56 and thereby to successively operate relays 25 and 28 to their negative positions, although at the same time, the current resulting from the unbalance of receiving circuit 56 caused by the voltage drop across resistance 30, was in such a direction as to hold relay 25 in is positive position. The polarity of these opposing currents are indicated in curve c by the fifth vertical line, the solid portion representing the direction of the line current and the dotted portion representing that of the current produced by the voltage drop. When brush 35 reaches segment A'₃, negative pole of battery 27 is connected to the positive pole of battery 47 and the third magnet of printer A' operates.

When brush 16 passed over the long segment and its adjacent segment B₃, the voltage drop across resistance 30 due to the negative current flowing over the left-hand contact and armature of relay 25, upsets the balance of receiving circuit 57, which tends to operate receiving relay 26 to its positive position, but, inasmuch as the strong negative current which is still being received from the line and which is indicated by the sixth impulse in curve b, is simultaneously upsetting the balance of receiving circuit 57, but in the opposite direction, relay 26 is therefore held in its negative position therefore holding relay 31 also in its negative position. In curve c the polarity of the currents flowing through receiving circuit 57 when the sixth line impulse is received, are represented by the sixth vertical line, the dotted portion representing the tendency of the current due to the voltage drop and the solid portion representing the operating effect of the line current. As brush 36 reaches segment B'₃, the negative pole of battery 27 is connected to the positive pole of battery 55 and the third magnet of printer B' operates.

At the end of the line impulse of three units length, a long signal of positive polarity is received and as brush 16 passed over the long segment and its adjacent segment A₄, the current due to the voltage drop across resistance 30 becomes effective to cause relay 25 to move to its positive position because the line current has dropped off to zero value. The seventh vertical line in curve c represents the positive polarity of the local current voltage combining with the line current voltage which has now reached a negligible value. The remaining portions of curves b and c will be readily understood from the foregoing.

*Description of the circuit of Fig. 2*

Fig. 2 shows another interpolating system of the regenerating resistance type somewhat similar to that shown in Fig. 1, except that the signal impulses which are received in condenser 75 of relatively large capacity, are not impressed on a condenser for primary storing. Instead, the signal impulses passing through condenser 75 are impressed directly through receiving ring set 76 upon the vacuum tube receiving circuit shown diagrammatically by block 56—57. The operation of the vacuum tube circuits is the same as that described above for Fig. 1. The method of operating receiving relays 25 and 26, printer relays 28 and 31, and printer ring sets 33 and 34, and the function of regenerating resistance 30, is also the same as described above for Fig. 1. A feature of this arrangement is the employment of condensers 77 and 78, arranged in shunt across the windings of relays 25 and 26, respectively. The purpose of condensers 77 and 78 is to delay operation of their respectively associated receiving relays until brush 16 has passed off a signal segment. This arrangement insures the operation of the receiving relays in accordance with any of the transmitted signals. This arrangement may be substituted for the primary storing arrangement shown in Fig. 1.

*Description of the circuit of Fig. 3*

Fig. 3 shows a modification of Fig. 1 wherein the printer ring sets 33 and 34 are replaced by a single retransmitting ring set 80 which is connected to cable 81 for further transmission. In this circuit, the printer relays 28 and 31 of Fig. 2 are replaced by retransmitting relays. It will be noted that no equipment other than retransmitting ring set 80 and cable 81 is shown, but it is understood that the equipment shown above section line a—a in Fig. 2 may be employed in Fig. 3.

It is obvious that two retransmitting ring sets may also be used where it is desired to repeat the signals incoming over cable 11 in Fig. 1 over two outgoing lines or cables. Furthermore, the signal impulses may be repeated by the retransmitting relays directly to the line or cable, in which event, the receiving ring set at a terminating station (not shown) would correspond to the receiving ring set 14 shown in Fig. 1 or the receiving ring set 76 shown in Fig. 2.

*Description of the circuit of Fig. 4*

Fig. 4 shows a modification of Fig. 1 wherein an even number of pairs of vacuum tubes may be employed for interpolating impulses in telegraph systems. A system showing this modification provides for cases where the total number of vacuum tube pairs is not a multiple of 3, such as systems having 2, 4, 8, 10, etc. channels. This system is generally the same as that shown in Fig. 1 or Fig. 2 except that four pairs of vacuum tubes 82, 83, 84, and 85 are provided. The live, or short segments of ring set 81 are divided into four groups, each group being connected to one of the four pairs of tubes. This arrangement necessitates the use of four printer ring sets 86, 87, 88, and 89, the last set not being shown. The operation of the receiving relays 90 to 93 and their respectively associated printer relays 94 to 97 is effective in the same manner as that described above for Fig. 1.

*Description of circuit arrangement in Fig. 5*

Fig. 5 is a modification of Fig. 4 which is especially adapted to systems employing an even number, more than two, of receiving relays. The arrangement shown, provides, like that shown in Fig. 4, for four pairs of vacuum tubes, 101, 102, 103, and 104 which pairs are respectively connected to four multiples of receiving segments (not shown) over conductors 105, 106, 107, and 108. Likewise, receiving and printer relays are associated in each pair of vacuum tubes. This arrangement differs from that shown in Fig. 4 in that the second tube of each pair is not affected by impulses from either the line or the interpolating source, it being employed solely to establish a steady space current equal in value but opposite in effect to the normal space current in the first tube. The space currents therefore, balance each other magnetically in the relay. Thus, the long impulse received from the line is impressed on the grid of the first tube of a pair and on its associated storing condenser, to vary the space current of the first tube in accordance with polarity of the line impulse. In other words, if the line impulse is of positive current, an increase in space current occurs and therefore, upsets the balance of the currents flowing through the windings on the receiving relay, which consequently operates to its positive position, but, if the line impulse is negative, the space current decreases and the receiving relay operates to its negative position. The receiving relay controls the operation of its associated printer relay and a regenerating resistance connected in the circuit of the printer relay is effective to produce interpolating impulses in the same manner as described above for Fig. 1. At no time is space current of the second tube affected either by the line or by the interpolated impulses.

*Description of circuit of Fig. 6*

Fig. 6 is a modification of Fig. 4 wherein the second tube of each pair of vacuum tubes is replaced by a balancing resistance such as one of those designated, 111, 112, 113, and 114. In this arrangement, the balancing resistance serves to maintain the current flowing through right-hand winding of the associated receiving relay equal to the normal current flowing through the left-hand winding and it is only when current in the left-hand winding is increased or decreased by the line or interpolated impulse that the receiving relay operates.

*Description of circuit of Fig. 7*

Fig. 7 is another modification of Fig. 4 wherein the second tube of each pair, the balancing resistances and the differential character of the receiving relay are eliminated, the relays being of the type such as those designated 121, 122, 123, and 124. Thus, one tube is employed for each receiving relay. In this arrangement the receiving relay is shunted by a resistance and a battery, and it is, therefore, operated by any appreciable voltage change across the resistance. The receiving relays are of the polarized type and are operable to either their positive or negative positions in accordance with polarity of the line or interpolated impulse.

Figure 8:
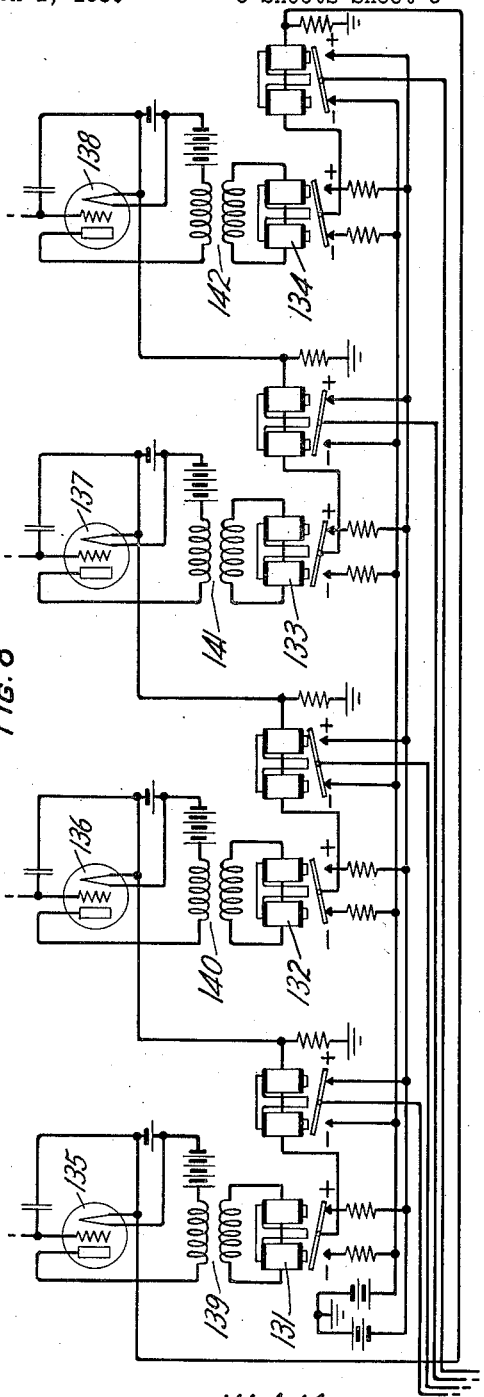

*Description of circuit of Fig. 8*

Fig. 8 is another modification of Fig. 4 wherein the receiving relays 131, 132, 133, and 134 are coupled to the plate circuit of the vacuum tubes 135, 136, 137, and 138 respectively. Therefore, any increase or decrease produced in the space currents of vacuum tubes 135 to 138 will produce a corresponding effect in the primary windings of transformers 139, 140, 141, and 142 respectively and these effects in turn, will produce voltages in the secondary windings of the transformers. The currents produced in the secondary windings cause operation of the receiving relays.

What is claimed is:

1. A synchronous interpolating signaling system comprising a transmission line, a plurality of electro-magnetic means successively connected in continuous rotation to said line to be capable of being affected by the received impulses and to be capable of being simultaneously affected by the preceding electro-magnetic means and in the opposite sense to the impulse operating the preceding means, the impulses simultaneously affecting each means being effective through one winding, characterized in this, that each of said means always remains in a stationary position in response to impulses received from its preceding means during intervals wherein no signals are being received from said line.

2. A synchronous interpolating signaling system comprising a transmission line, a plurality of receiving magnets, a local source of current impulses for operating said magnets, each electro-magnetic means arranged to be energized over one winding by the impulses received from said line and said local source, armatures for said electro-magnetic means for transmitting impulses of reversed polarity to said magnets, a distributor, means including said distributor for operating the armatures of said electro-magnetic means in response to impulses received from said line, and means independent of said distributor whereby each of said electro-magnetic means is controlled by its preceding electro-magnetic means when no impulses are being received from said line, said armatures always remaining stationary when transmitting impulses of reversed polarity to said magnets during the intervals wherein no impulses are being received from said line.

3. A synchronous interpolating signaling system comprising a transmission line, a plurality of relays successively connected in continuous rotation to said line to be capable of being affected by the received impulses and to be capable of being simultaneously affected by the preceding relay and in the opposite sense to the impulse operating the preceding relay, the impulses simultaneously affecting each of said relays being effective upon common relay windings, and storing means connected directly in the operating circuits of said relays for producing voltages sufficient to operate said relays.

4. A synchronous interpolating signaling system comprising a transmission line, a plurality of relays successively connected in continuous rotation to said line to be capable of being affected by the received impulses and to be capable of being simultaneously affected by the preceding relay and in the opposite sense to the impulse operating the preceding relay, and a storing means common to a plurality of the relays for producing voltages sufficient to operate said plurality of relays.

5. A synchronous interpolating signaling system comprising a transmission line, a distributor connected to said line, a plurality of relays successively connected in continuous rotation to said line through said distributor, said relays being capable of being affected by the impulses received from said line and to be capable of being simultaneously affected by the preceding relay and in the opposite sense to the impulse operating the preceding relay, and a condenser connected to said distributor for storing the signal impulses received from said line, the successive discharges of the condenser being distributed to operate said relays in succession.

6. A synchronous interpolating signaling system comprising an incoming line, a plurality of electro-magnetic relay devices, distributor means for connecting said devices in rotation into a circuit to be under the potential control of impulses received from said line, circuit connections whereby each said relay device in succession is connected to be under the potential control of a preceding relay device if and when the control by impulses received from said line is not effective, characterized in this, that the number of said relay devices is an even number greater than two.

7. An impulse relaying system comprising a thermionic discharge device, a second thermionic device, each of said devices having a control element, an electromagnetic relay having a single winding, an anode-cathode circuit for said first discharge device electrically coupled to said winding, an anode-cathode circuit for said second discharge device coupled to said winding in a direction so that current flowing through said winding and in a given direction through said second device has an effect upon said relay opposite to the effect of current flowing through said first device in a corresponding direction, and an input circuit electrically coupled to and controlling one of said control elements, the other of said control elements being so arranged in the system as to be free of control by said input circuit and the anode-cathode circuit of said first device.

8. A system comprising a plurality of systems each comprising the elements of claim 7, a potential storing device common to said plurality of systems, each of said plurality of systems being arranged to be connected in turn to said storing device, a circuit, a source of signal impulses incoming over said circuit, and a rotary device for causing each of said signal impulses to be stored in turn in said storing device and for distributing the impulses in said storing device, in turn, to said plurality of systems respectively in a continuous rotation.

9. A system for receiving long telegraphic impulses and interpolating short impulses at times when said long impulses are ineffective in amplitude comprising an even number of space discharge tubes having input grid circuits and anode-cathode output circuits, a distributor having short active segments for distributing impulses from an incoming path to the grid circuits of said tubes in succession to control the current flow condition in their respective anode-cathode circuits, means controlled by the current flow conditions in the anode-cathode circuit of each of said tubes in succession tending to polarize the grid circuit of the next succeeding tube in the series to a polarity opposite to that grid polarity of the preceding tube causing the polarization, elements adapted to respond to signal impulses, and distributor means having segments long as compared with said first-named active segments and operative in synchronism with said distributor for distributing marking and spacing impulses in succession to said elements under the consecutive control of the current flow conditions of said anode-cathode circuits in accordance with the polarity condition of said grids at the instant of operative association of said elements with said anode-cathode circuits for control of any particular element with any particular anode-cathode circuit.

10. A system for receiving long impulses and interpolating short impulses at times when said long impulses are received in ineffective amplitude comprising an even number of space discharge tube systems having grid input circuits and anode-cathode output circuits, a distributor having short active segments for distributing impulses from the incoming path to the grid circuits of said tube systems in succession, means controlled by current flowing in the anode-cathode circuit of each of said tube systems in succession tending to polarize a grid circuit of the next succeeding tube system in the series to a polarity opposite to the grid polarity of the tube of the preceding tube system causing the polarization, printer magnets adapted to respond to signal impulses, and distributor means having long segments operated in synchronism with said first-named distributor for distributing marking and spacing impulses in succession to said elements under the consecutive control of current flowing in the anode-cathode circuits in accordance with the polarity condition of said grids at the instant of operative association of said printer magnets with said anode-cathode circuits for control of any particular printer magnet with any particular anode-cathode circuit.

WILLIAM A. KNOOP.